US008237083B2

(12) United States Patent
Walter et al.

(10) Patent No.: US 8,237,083 B2
(45) Date of Patent: Aug. 7, 2012

(54) METHOD FOR BORING BOTTLE-LIKE HOLES HAVING A DEFINED GEOMETRY BY MEANS OF PULSED LASER RADIATION

(75) Inventors: Herbert Walter, Fluorn-Winzeln (DE); Gisbert Staupendahl, Jena (DE)

(73) Assignee: Prelatec GmbH, Stuttgart (DE)

( * ) Notice: Subject to any disclaimer, the term of this patent is extended or adjusted under 35 U.S.C. 154(b) by 253 days.

(21) Appl. No.: 12/739,615

(22) PCT Filed: Oct. 22, 2008

(86) PCT No.: PCT/EP2008/008899
§ 371 (c)(1),
(2), (4) Date: Jun. 16, 2010

(87) PCT Pub. No.: WO2009/053031
PCT Pub. Date: Apr. 30, 2009

(65) Prior Publication Data
US 2011/0198321 A1     Aug. 18, 2011

(30) Foreign Application Priority Data
Oct. 25, 2007    (DE) .................... 10 2007 051 408

(51) Int. Cl.
*B23K 26/00* (2006.01)
(52) U.S. Cl. ................................. 219/121.71
(58) Field of Classification Search ........... 219/121.71, 219/121.69, 121.7, 121.72
See application file for complete search history.

(56) References Cited

U.S. PATENT DOCUMENTS

| 6,617,002 | B2* | 9/2003 | Wood .................... 428/131 |
| 6,642,477 | B1* | 11/2003 | Patel et al. ........... 219/121.71 |
| 7,202,441 | B2* | 4/2007 | Klugl et al. .......... 219/121.71 |
| 2002/0158152 | A1 | 10/2002 | Hockenberger |
| 2004/0017430 | A1* | 1/2004 | Mizuyama et al. ... 219/121.71 |

(Continued)

FOREIGN PATENT DOCUMENTS

DE              27 13 904         3/1977
(Continued)

OTHER PUBLICATIONS

International Search Report for Ser. No. PCT/EP2008/008899 filed Apr. 30, 2009, 6 pages.

(Continued)

*Primary Examiner* — Kevin M Picardat
(74) *Attorney, Agent, or Firm* — Andrew F. Young, Esq.; Lackenbach Siegel, LLP

(57) ABSTRACT

The present invention is a method and system for the drilling of holes in a workpiece within a diameter range of 20 µm to 500 µm by means of laser radiation. The invention utilizes the beam quality of a laser beam as well as: the polarization of the laser radiation; the parameters of the impulses of the laser used; and, the type and pressure of the process gas used. The method and system utilize means for focusing laser radiation, in particular the ratio of the beam diameter at the site of the focusing element and its focal distance, and wherein the focusing is done in coordination with the beam quality number and wave length and other factors. A first working gas supports the formation of the hole shape and accelerates the drilling process; and, a second working gas is utilized to improve the surface quality of the drilling walls.

30 Claims, 6 Drawing Sheets

U.S. PATENT DOCUMENTS

2005/0006359 A1* 1/2005 Blakey .................... 219/121.71

FOREIGN PATENT DOCUMENTS

| | | |
|---|---|---|
| DE | 30 07 169 | 2/1980 |
| DE | 3934587 A1 | 4/1991 |
| DE | 197 45 280 A1 | 4/1999 |
| DE | 199 05 571 C1 | 11/2000 |
| DE | 101 05 674 | 8/2002 |
| DE | 10054853 A1 | 8/2002 |
| DE | 10105674 A1 | 8/2002 |
| DE | 101 44 008 A1 | 3/2003 |
| DE | 101 38 866 A1 | 5/2003 |
| DE | 102 19 608 | 11/2003 |
| DE | 103 15 967 | 10/2004 |
| DE | 103 40 931 | 3/2005 |
| DE | 10 2004 014 820 A1 | 10/2005 |
| DE | 102005019580 A1 | 11/2005 |
| DE | 10 2004 054 587 B3 | 5/2006 |
| DE | 102004054587 B3 | 5/2006 |
| DE | 10 2007 051 408 | 5/2009 |
| EP | JP 59 087271 | 5/1984 |
| EP | 0 299 143 | 1/1989 |
| EP | 0 826 457 A1 | 3/1998 |
| EP | 2048354 A1 | 4/2009 |
| FR | 2 528 915 | 12/1983 |
| GB | 2 227 965 A | 8/1990 |
| GB | 2 355 222 A | 4/2001 |
| JP | 11192574 A | 7/1999 |
| WO | WO 2005/023480 A1 | 3/2005 |
| WO | WO 2010/121767 | 10/2010 |

OTHER PUBLICATIONS

Republished International Search Report for Ser. No. PCT/EP2008/008899 dated Jul. 9, 2009 (8 pages).

International Search Report for Ser. No. PCT/EP2010/002378 filed Apr. 19, 2010, 16 pages, mailed Aug. 17, 2010; 5 pages—English translation.

German Office Action dated Oct. 7, 2008, Appln. No. 10 2007 051 408.7-34, 5 pages, translation into English, 3 pages.

German Office Action dated Oct. 7, 2008, Appln. No. 10 2009 017 788.4-13, 3 pages, translation into English, 2 pages.

* cited by examiner

METHOD FOR BORING BOTTLE-LIKE HOLES HAVING A DEFINED GEOMETRY BY MEANS OF PULSED LASER RADIATION

CROSS REFERENCE TO RELATED APPLICATIONS

This application is a National Phase Entry of PCT Patent Application Serial No. PCT/EP2008/008899, filed Oct. 22, 2008, and claims priority from German Patent Application Serial No. 10 2007 051 408.7, filed Oct. 25, 2007, the entire contents of each of which is herein incorporated fully by reference.

FIGURE FOR PUBLICATION

FIG. 1

BACKGROUND OF THE INVENTION

1. Field of the Invention

The present invention relates to a method and system for the drilling of holes, of defined geometries. More specifically, the present invention relates to a method and system for the drilling of holes, of defined cross sections of holes, by means of complex laser technologies as further described herein.

2. Description of the Related Art

The related art involves In addition to present conditions on the part of the engine such as combustion chamber shape, air movement and nozzle location, the combustion process in diesel and gasoline engines depends on a multitude of injection system parameters. They include the nozzle design and the appurtenant nozzle hole location, the number of holes, the hole length for the atomization of the fuel into the combustion chamber as well as the amount and chronological course of the injection pressure.

An increase in the overall degree of efficiency of the engine and the reduction of raw emission are consequently determined to a large degree by the optimization of the injection systems. A decisive improvement of the combustion process in diesel and gasoline engines can be achieved via these parameters.

In this context, decisive criteria are the reduction of the size of the fuel droplets as well as of the flow loss during the injection process. Smaller nozzle borings in conjunction with greater pressure generally lead to a smaller size of the fuel droplets. The bore diameter and an aerodynamically efficient design of the borings are relevant parameters in this regard.

For years, the injection pressure has been increased and the spray hole has been reduced for the conversion of an optimal fuel mixture preparation. Since this approach favors cavitation phenomena in the spray hole that in an extreme case will damage the nozzle and in any event reduce the flow through of the nozzle due to the existing gas phase, work has been going on even today with various conicities of the spray holes that taper in downstream direction. Moreover, it shows that if a critical hole diameter falls below approximately 100 µm, carbonization phenomena occur in the spray hole that clearly reduce the flow with increasing age of the aggregate. Now the question arises to what extent one can increase the hydraulic degree of efficiency of the nozzles through specific shapes of the spray hole so that the effects of carbonization and cavitation are prevented and the break-up of the jet is intensified to provide a better air feed into the spray, thereby increasing the life span of the nozzles.

The current state of the art is characterized by the fact that the shape of such holes, regardless of whether they are produced through mechanical drilling, eroding, ultrasound or laser processes, is cylindrical or conical with more or less straight walls. But this way it is not possible to create fluidically optimal conditions for the atomization of fluids.

With regard to the laser methods, numerous proposals exist in the patent literature for an improvement of the accuracies, in particular the sphericity, hole shape or the reduction of the negative impact of melting components on the surface quality of the boring as well as for an enlargement of the hole in the direction of injection. The majority of the considerations are purely geometric/optical, coupled with suitable mechanical components.

Since the parameters of a laser beam, in particular its intensity distribution, does not meet the high requirements made of the sphericity, for example of a hole in injection nozzles, there are several optical/mechanical variants to eliminate this problem. In this regard, DE-OS 32 17 226 A 1 proposes rotating the radiation bundle around its own symmetry axis which in DE-OS 197 45 280 A 1 is expanded to three modules that are arranged in front of the focusing lens and that permit varying the point of impact and its inclination on the workpiece. A specific image rotator is described in DE-OS 197 41 09 A 1, for example.

Measures for an improvement of the surface quality of the boring can be found in DE OS 30 07 169 A 1 in which a sufficiently high heating of the work piece during laser processing is supposed to create a uniform molten film, in DE-OS 27 13 904 A 1 where a second laser beam functions as melting beam that is supposed to melt away the burr created during the actual drilling process, or in patent specifications DE 101 40 533 B 4 where a sacrificial layer is supposed to improve the quality of the drilling by means of ultra-short laser impulses.

Patent specification GB 2227 965 addresses the shape of the hole, specifically its widening in the direction of the jet. Here, controlling the beam is proposed with regard to impact angle and distance between the beam and boring axes with the objective of realizing conical holes of varying wall inclinations in as variable a fashion as possible. The more theoretical considerations concerning the intensity profile of the boring beams in patent specification DE 10 2004 014 820 B 4 serve the same objective. The arrangement described in patent specification DE 99 05 571 C 1 also serves to create defined conical hole shapes with a widening in the direction of the jet. The basic idea consists of a synchronous rotation of the polarization direction of the laser beam with a wobbling motion of the beam created by a corresponding mechanism.

Multi-stage processes consisting of a first step, the pre-drilling, and a second step, the creation of the final drill hole shape, serve to effectuate the entire drilling process on the one hand and to increase the precision of the realized hole on the other hand. To this end, a coupling between laser and erosion processes may be used, as described, for example, in EP 0 299 143 A 1 and DE 10 2004 054 587 B3, or two lasers with different beam properties as shown in DE-OS 101 44 088 A 1 may be used. In DE 10 2004 054 587 B3 it is pointed out, among other things, that, based on the state of the art, in the case of small injection holes with diameters of an 80 µm magnitude, approximately 24 holes per nozzle must be drilled in order to reach the required injection volumes per unit of time. In the case of such large numbers of holes, a considerable negative effect on nozzle stability and thus on functional reliability and durability must be expected in addition to increased labor costs. The novel hole shapes in accordance with the invention which are described in detail in the following, provide an essential step forward in the state of the art from this aspect as well since due to the greatly reduced flow resistances in particular of small holes, such large hole numbers may be dispensed with out making increased demands for example on injection pressure.

What is not appreciated by the prior art is that all the proposals enumerated above lack a deliberate consideration of the characteristics of the interaction between laser radiation and material that are coupled with the wave properties of laser radiation, in particular diffraction, in order to achieve fluidically optimal hole shapes. They are limited to cylindrical holes and conic hole shapes with more or less large opening angles.

Accordingly, there is a need for an improved method and system for the creation of hole cross sections by means of which an optimal atomization of fluids can be assured, with the most important area of utilization being the drilling of injection nozzles for combustion engines.

ASPECTS AND SUMMARY OF THE INVENTION

An aspect of the present invention is to provide a solution to the still acute problem of fluidically optimal hole shapes by means of novel hole shapes and methods for their production.

The improvement is not to dwell on the conventional laser technologies for hole shapes limited to cylindrical or conical cross section, but to start from fluidically optimal hole shapes and to provide suitable technologies and methods for their manufacture.

The demands that a fluidically suitable hole has to meet are clear in view of this invention: The amount of fluid to be atomized per unit of time should be transported to the exit opening of the hole at the lowest possible flow resistance and consequently with a relatively low loss of pressure in such a way that flow rates and flow conditions (laminar/turbulent) prevail at this site that assure optimal atomization and thus, in the concrete case of a fuel injection nozzle, optimal distribution of the fluid in the combustion chamber.

According to the basic idea of the method in accordance with the invention, a bore hole shape is created that is characterized by three sections which, looked at in the direction of the flowing fluid, consist of a first section, the cylindrical part for the fluid feed with diameter $d_E$; an adjacent second section in which this diameter tapers; and finally a third section which again is cylindrical and has the diameter $d_A$ of the fluid exit opening. Consequently, the bore hole has a bottle-like shape which becomes even more clear when one looks at the aspect ratios of the individual sections. The first section (the "bottle body") should have a length $L_E$ which, for example, is three times the length $L_A$ of the third section of the boring, the "bottle neck". The shape of the second section, the "transition area", is supposed to assure a fluidically favorable transition from section 1 to section 3. This is best done by means of a continuous, rounded and edge-free bore path from $d_E$ to $d_A$. The idea of this shape becomes clear when one looks at the intended rapid flow through of a fluid through such a boring, in particular the fast flow through of fuel through an injection nozzle opening. Speaking in roughly simplified terms, section 1 with its relatively large diameter (the ratio of $d_E$ to $d_A$ should preferably lie within the interval of 1.3 to 2.0) will then serve to feed the fluid at a relatively low flow resistance to the actual part of the boring with a "nozzle function", namely sections 2 and 3. The tapering of the diameter in section 2 delivers, in accordance with the continuity equation of fluid mechanics, an increase in the flow rate that is the decisive parameter for an effective atomization of the fluid at the nozzle exit of diameter $d_A$. Due to the relatively short length $L_A$ of section 3, the flow resistance that is being built up there is relatively low if compared, for example, with conventional holes of a cylindrical cross section. It is obvious that, in the case of the same flow conditions at the nozzle exit, especially with the same outflow rate of the fluid or, respectively, with the same amount of fluid flowing out per unit of time, the described bottle shape has fluidically considerably more favorable properties that are reflected, for example, in a considerably lower required injection pressure as compared with the conventional cylindrical or conical nozzle holes.

The described basic shape of the bore hole may be varied within wide limits under utilization of all available optical and mechanical possibilities and thus be adapted to concrete requirements. For example, the diameter and length ratios may be selected within the limits stated herein.

The creation of the represented bore hole shape in accordance with the invention requires suitable process steps that are to be explained in detail in the following. In addition to the parameters and technological steps mentioned in the preamble of Claim 1 that are ultimately required in general to achieve a qualitatively valuable bore hole, the essence of the process for the creation of such holes in accordance with the invention lies above all in the purposeful exploitation of the dispersion properties of laser radiation in the focus area, i.e. the caustics, on the one hand, as well as in the integral absorption and reflection conditions in the bore hole, on the other hand. The former are determined by the wave length of the radiation, the intensity profile of the radiation at the location of the focusing element which in general is expressed by the beam quality number K, and the imaging properties of the focusing element which, in the simplest case, consists of a lens having the lowest possible number of imaging flaws.

The absorption and reflection conditions in the bore hole itself, i.e. in deep areas that are larger than the hole diameter at the beam entry, turn out to be extraordinarily complex and depend—in addition to the usually exclusively discussed Fresnel absorption that is theoretically easy to register if one knows the optical constants n and K of the material, the polarization of the radiation as well as the angle of incidence—on several parameters that are difficult to register with precision. They include e.g. the absorption of the radiation by the metal vapor and the laser-induced plasma present in the bore hole, but also the dispersion of the radiation by extremely fine material particles that leads to an increased (and generally undesired) radiation impact on the bore hole walls. While in the case of long-wave lasers ($CO_2$ lasers), plasma absorption may rise to considerable values, dispersion must be taken into account in particular in the case of short-wave lasers (e.g. Nd:YAG lasers). Other influential parameters are the working gas used; the surface structure of the bore holes (roughness!) forming during the boring process; and finally the heat conduction properties of the material.

In order to be able to clearly identify the essence of the invention, the aforementioned secondary effects will be neglected in the following contemplations and only the primarily decisive magnitudes of caustic form and Fresnel absorption will be discussed under the aspect of creating the bore hole shapes in accordance with the invention. The bottle shape described above shall always serve as an example.

The bore hole sections defined above also determine, in a certain way, the segments of the boring process that are characterized by different processing parameters. In accordance with the invention, the respective specifics will be reduced, as already stated above, to the perhaps chronologically varying magnitudes beam dispersion (caustic form) and intensity under the aspect of Fresnel absorption in the bore hole and taking into account the wave length of the radiation. Under these preconditions, a "bottle shape" can be realized in various ways, and the boring process can in principle be divided into two segments, (i) the pre-boring segment and (ii) the shaping segment.

1. Pre-Boring Segment:

This first part of the boring process is characterized by two processing objectives—on the one hand, it is supposed to realize to a large extent the "bottle neck" in its desired shape and, on the hand, to create favorable preconditions for the second boring segment. The latter may mean, for example, that the length of the bottle neck and thus the starting point of the widening area is determined by a blind boring of a defined depth or that a through boring is created that in the area of the bottle neck already approximately meets the parameters in its dimensions but that in sections 2 and 3 of the boring still needs to be shaped. For the pre-boring segment, laser radiation as well as alternative processes such as machining, eroding or ultrasound treatment may be used.

In the use of laser radiation it is typical that the pre-boring segment is generally carried out with radiation of a fixed wave length, a fixed intensity profile, i.e. a fixed K number and thus ultimately with a fixed caustic form in the focus area.

2. Shape-Giving Boring Segment

In this second part of the boring process, the transition area and the area of the "bottle body" are to be created in accordance with fluidic parameters. This segment forms one center of the process solutions in accordance with the invention. The objective of widening the bore hole "downward" under defined parameters can be realized in different ways but requires in each case a suitable caustic form. This may (a) correspond to the caustics of the pre-boring process and consequently be kept constant during the entire boring process, (b) be changed by the caustics of the pre-boring process to an optimized caustic form for the shape-giving boring and be kept constant during the shape-giving boring until the completion of the entire boring process, or finally, (c) be characterized by a caustic form that is chronologically variable during the shape-giving boring.

The adaptation of the caustic form to the desired course of the boring process and thus to the desired hole shape may be realized by the variants of the beam forming discussed in the following, provided there is a chronologically constant focusing element:

1. The intensity profile or, respectively, the K number of the laser radiation is changed, to with either internally, i.e. in the laser resonator itself, by means of suitable measures such as chronological variation of the pumping process or by changing the optical resonator configuration, or externally, i.e. outside of the laser resonator, e.g. by installing suitable optical elements such as diffractive optics into the beam. Since in general an extremely reliable functioning of the laser itself is strived for and interventions in the laser function, especially in industrial continuous operation, harbor the danger of instabilities, the external methods of beam profile alterations are of particular practical interest. For example, during the transition from the pre-boring segment to the shape boring segment, a diffractive optical structural element can be installed swiftly, i.e. practically without any loss of time, in the beam path that gives the laser beam the desired shape. Another advantage of this is the fact that drastic changes are possible without any problem that would not be realizable to this extent by means of interventions in the laser function.
2. The beam diameter at the location of the focusing element is altered. Through this measure, on the one hand, the divergence of the radiation in the focus surroundings can be varied within wide limits; on the other hand, the focus diameter which depends reversely proportionately on the beam diameter at the location of the focusing element is influenced at the same time.
3. The beam divergence prior to the focusing is altered. The focus diameter changes proportionately thereto, and at the same time the focus position as well.

Options 2 and 3 can be realized, for example, by means of variable telescopes or adaptive optics in the beam path.

In the case of the aforementioned variants of beam formation, it was assumed that a laser would be used for the boring process. The use, for example, of two lasers that preferably have different wave lengths requires a considerably more costly effort but in return offers numerous new degrees of freedom in the realization of optimal hole shapes in the sense of the invention and provide new possibilities of adapting the form of the focus caustics to the requirements of the various boring phases. In this context it would be typical to use a laser of a shorter wavelength (e.g. within the range of 1 μm or shorter) for a precisely guided pre-boring process and to use a laser of a longer wavelength (e.g. a $CO_2$ laser at approximately 10 μm) for the shape-giving boring phase.

The basic method for the creation of the described hole shapes in accordance with the invention is based on the use of a single laser with a wave length adapted to the hole diameter, assuming as a rule of thumb that for typical cases the wavelength should be one size smaller than the hole diameter. If, for example, a $CO_2$ laser is used, holes with diameters in a magnitude of 100 μm can be bored particularly favorably. In this concrete example, the wavelength dependency of the diffraction causes the caustics of such a focused laser beam to have a considerably different shape than, for example, in the case of most lasers with wavelengths of approximately 1 μm that are used to bore such holes. The ten times stronger diffraction of the $CO_2$ laser radiation in combination with suitable focusing and the interaction of the beam quality number K of the laser as well as the specific Fresnel absorptions occurring on the bore hole walls are the key for the design of the desired bottle shape.

In this case, the entire boring process occurs from one direction, with, especially in the case of the bottle shape, the narrowest spot of the bore hole lying at the beam entry and the widened section lying in the direction of the beam in the lower part of the bored-through material. This meets, for example, the geometric requirements for holes in an injection nozzle.

For an active shaping of the bore hole during the course of the boring process, as shown above in general, the form of the focus caustics as well as its position can be varied. Possible influences of the described beam shaping variants on the boring process will be described in the following, once again in exemplary fashion:

e) During the boring process, the beam quality number K of the laser radiation is altered. For example, the boring process can be started with a relatively low beam quality and consequently with a relatively large focus diameter (pre-boring phase). After the "bottle neck" has been bored, a significant reduction of the focus diameter is achieved by increasing the K number, thereby protecting the sharp fluid exit edge created during the first boring phase from any damaging fusing during the further course of the boring process. This option is all the more important since during the shape-giving phase, i.e. during the creation of the widened bore hole parts, the work must proceed at relatively high radiation intensities.

f) Analogous results can be achieved through a variation of the laser beam diameter on the focusing lens during the boring process. Such a change of the diameter can be realized, for example, by means of suitable fast adaptive optics. Since the focus diameter depends reversely proportionately on the bundle diameter on the lens, the focus diameter as well as the form of the caustics are altered in this manner. During this process, one could for example start the boring process with a relatively small beam diameter and consequently with a relatively large focus diameter. Analogously to point a), the sharpness of the focusing is then improved by means of enlarging the beam diameter, thereby also protecting the fluid exit edge created during the pre-boring phase from any damaging fusion.

c) Another possibility for the use of fast adaptive optics consists in changing the divergence of the beam bundle impacting on the focusing element during the boring process. This achieves the fact that the focus position is varied in such a magnitude that the bore hole shape is influenced in the desired manner.

At this point, the specificity of the creation of very small holes with bottle shapes that are characterized, for example, by fluid openings with diameters within a range of a few 10 µm shall be addressed as well. This range is closed to the $CO_2$ laser; its limits can be indicated with approximately 60 µm. However, in the case of such small apertures, diffraction makes itself felt with its impact on the bore hole shape even with the use of lasers with a wavelength of, for example, in the range of 1-2 µm so that for the finest holes the considerations made above as a matter of principle can be transferred, for example, to the use of Nd:YAG lasers. In the case of lasers of that kind, the beam quality number can be varied within wide limits which can advantageously be used, for example, in combination with the diffraction of the radiation on the very small exit opening realized during the pre-boring phase for a widening of the lower sections of the bore hole.

As indicated before, the position of the focus caustics can also be used actively for the formation of bore holes in accordance with the invention. For example, it is possible to create, in addition to the described bottle shapes, a number of other modifications of the hole cross section by merely altering the focus position. By placing the focus more or less deep into the material to be bored, the narrowest part of the bore hole, for example, can be placed into the interior of the work piece. A special case of this is an "hourglass-shaped" bore hole in which the bore hole waist is located precisely at half the length of the bore hole (i.e. of the thickness of the material). The most varied intermediate stages between bottle shape and hourglass shape can be realized as well.

Another specific hole shape in accordance with the invention is characterized by the fact that in an additional process step the rotation-symmetrical bore hole is equipped with a preferably slit-shaped structure at the fluid exit in order to control the atomization behavior of the fluid in such a way that, for example in combustion engines, an optimal distribution is created. The dimensions of this slit-shaped structure may vary within wide limits but should typically lie within the intervals mentioned in Claim 10. This additional structure can be created either with the long-wave laser itself, i.e. preferably a $CO_2$ laser; a shortwave laser; or one of the alternative processes mentioned. For the special case that the holes to be prepared, for example in injection nozzles, are located on the same hole circle, the manufacturing process of this structure can be modified by integrating a continuous indentation of the desired dimensions on the hole circle of the bore holes even prior to the actual boring process either by defined material abrasion by means of laser radiation or through alternative methods, with the cross section of this indentation in principle possibly having any desired shape, but preferably shapes arranged symmetrically to the hole circle such as a triangle, rectangle, semicircle or the like.

In order to optimize the created bore hole with regard to surface quality and straight edges, the laser boring process can be divided in accordance with the invention into two phases with regard to the working gas, with the desired hole shape being created in the first phase using a first working gas that supports the formation of the hole shape and accelerates the boring process, and an improvement of the surface quality of the bore walls being realized in the second phase by means of a second working gas. Typical working gases would be, for example, oxygen for the first and argon for the second phase.

The above, and other aspects, features and advantages of the present invention will become apparent from the following description read in conjunction with the accompanying drawings, in which like reference numerals designate the same elements.

DETAILED DESCRIPTION OF THE PREFERRED EMBODIMENTS

Figure 1:
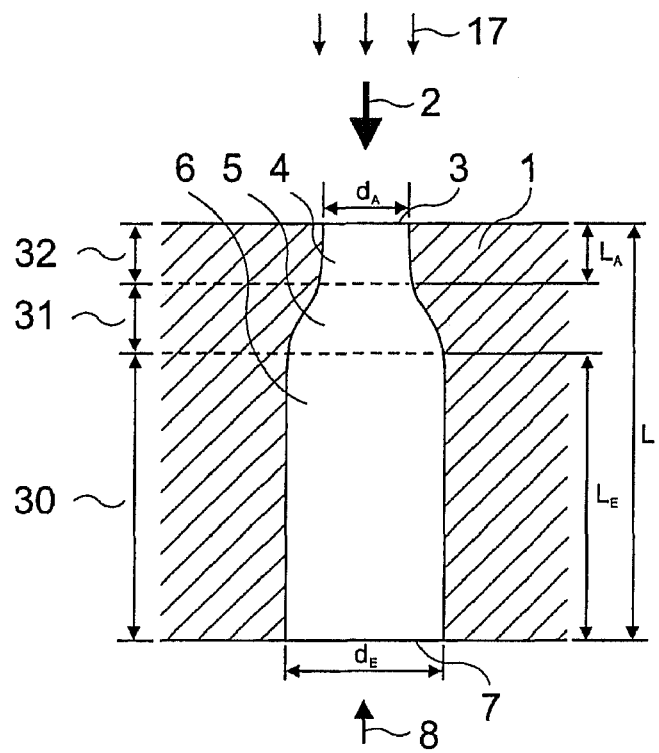
FIG. 1 is a view of the cross section of the injection hole in accordance with an embodiment of the present invention.

Reference will now be made in detail to several embodiments of the invention that are illustrated in the accompanying drawings. Wherever possible, same or similar reference numerals are used in the drawings and the description to refer to the same or like parts or steps. The drawings are in simplified form and are not to precise scale. For purposes of convenience and clarity only, directional terms, such as top, bottom, up, down, over, above, and below may be used with respect to the drawings. These and similar directional terms should not be construed to limit the scope of the invention in any manner. The words "connect," "couple," and similar terms with their inflectional morphemes do not necessarily denote direct and immediate connections, but also include connections through mediate elements or devices.

FIG. 1 shows the cross section of the nozzle hole in accordance with the invention in a first embodiment which simultaneously reflects the basic shape, namely a "bottle shape", of the hole. This hole is characterized by three segments that result from fluid engineering considerations. Looked at from the direction of the flow B of the fluid, this hole initially has a relatively wide first segment 30 with a diameter $d_E$ which extends over a length $L_E$ from the fluid entry opening 7 to the transition area 5 in which a narrowing of this diameter to $d_A$ occurs. The function of this quasi cylindrical fluid entry area 6 (the "bottle body") is to transport the fluid at the lowest possible flow resistance and thus at a low loss of pressure to the second segment 31 of the bore hole, the transition area 5 and ultimately to the third segment 32, the quasi cylindrical fluid exit area 4 (the "bottle neck") that is decisive for the type of exit, e.g. its atomization. If the fluid is a practically incompressible fluid, an increase of the flow rate from $v_E$ at the fluid entry opening 7 to $v_A$ at the fluid exit opening 3 occurs in area 5 at a preset pressure differential $p_E$-$p_A$ ($p_E$ is the static fluid pressure at the fluid entry opening 7, $p_A$ the static pressure at the fluid exit opening 3 based on the continuity equation of fluid mechanics. The differential $v_A$-$v_E$ is determined by the ratio of $d_E$ to the diameter $d_A$ of the fluid exit opening 3, and $v_A/v_E = d_E^2/d_A^2$ applies. In general, the greatest possible $v_A$ is strived for at a preset $p_E$-$p_A$ in order to achieve an efficient atomization of the fluid. In the final analysis, the magnitude of $v_A$ depends, in addition to the pressure differential $p_E$-$p_A$, on the overall flow resistance of the hole. The latter's length L is essentially predetermined by the thickness $L_W$ of the material 1 which results from resistance considerations with regard to the nozzle conception.

If the hole must be bored into the material 1 at an angle—a typical requirement in the case of modern optimized injection nozzles—L>$L_W$ which, of course, also affects the flow resistance. Here, another essential advantage of the nozzle shape in accordance with the invention comes to bear which becomes immediately clear if one compares, for example, a cylindrical boring with the bottle shape. While in the case of the cylindrical boring the enlargement of the bore length will automatically lead to an increase in the flow resistance, this negative effect of an angled bore hole is negligible in the case of the bottle shape because there, the flow resistance is concentrated above all on the bottle neck 4 with its relatively—in comparison with L—short length $L_A$. The latter may be varied without any problems through minimal changes of the boring parameters in such a way that the same flow resistance or, respectively, the same exit rate and the same exit amount will result for all holes regardless of their individual inclination relative to the perpendicular on the surface of the work piece.

In general, the possibility in principle of being able to vary the parameters $d_E$, $d_A$, $L_A$ and $L_E$ within sufficiently wide limits during the creation of the hole plays a large role in the case of the functional optimization of the shape of a nozzle hole in accordance with FIG. 1.

Equally important is the fact that the hole can be created from one working direction 2 since in the case of numerous important applications of such nozzle holes, e.g. in the case of injection nozzles of combustions engines, a 2-step boring from front and back is virtually impossible due to the geometry of the overall nozzle.

An essential role in the boring process is played by the working gas 17. Oxygen and argon are preferably used for the boring of holes in injection nozzles, as already mentioned above.

Figures 2A, 2B:
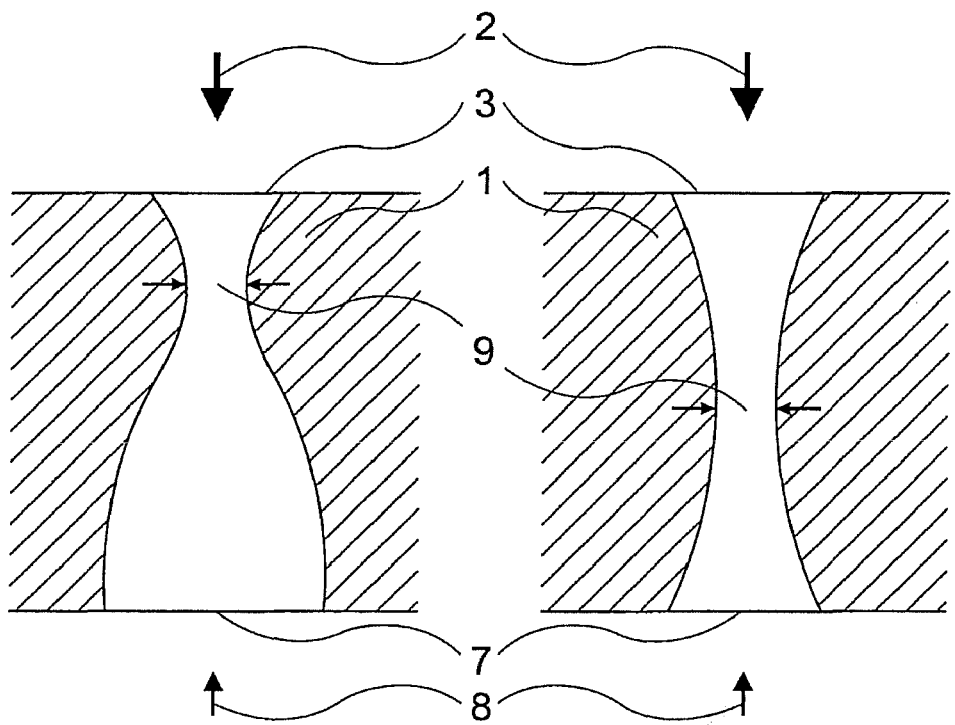
FIG. 2A is a view of the cross section of the injection hole in accordance with a second embodiment of the present invention.
FIG. 2B is a view of the cross section of the injection hole in accordance with a third embodiment of the present invention.

FIGS. 2A and 2B show two additional typical embodiments of the bore hole in accordance with the invention in which the "waist" of the bore hole 9 lies inside of the work piece. If it is exactly centered in the work piece (FIG. 2b), an hour glass-like shape will result.

Figure 3:
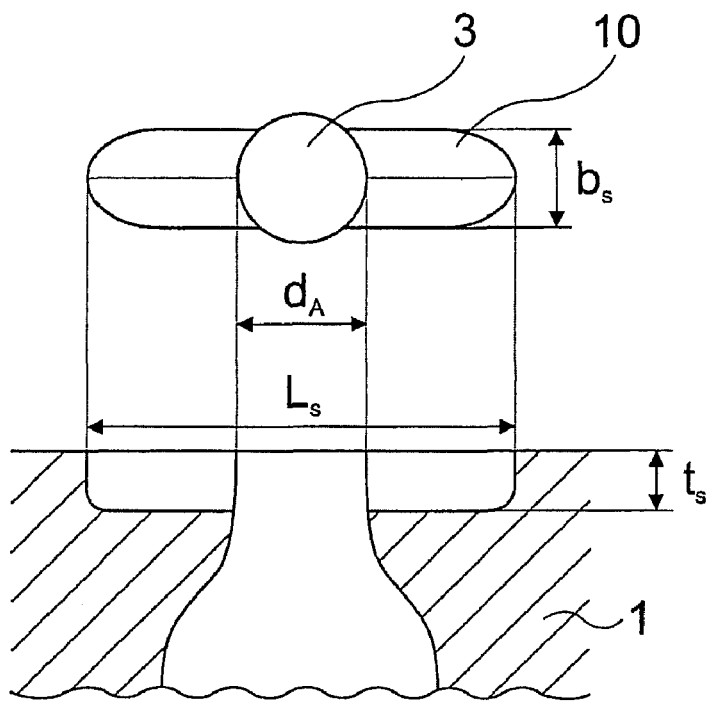
FIG. 3 is a top view and cross section of an injection hole in accordance with the present invention and showing a defined transverse slit at the fluid exit.

FIG. 3 shows an additional embodiment of the bore hole in accordance with the invention in cross section and top view. This hole shape is characterized by an auxiliary slit 10 of breadth $b_S$ and depth $t_S$ where $t_S$ should not be greater than the length of the bottle neck $L_A$. Its function lies in a defined modification of the atomization characteristics of the round original bore hole 3.

Figure 4:
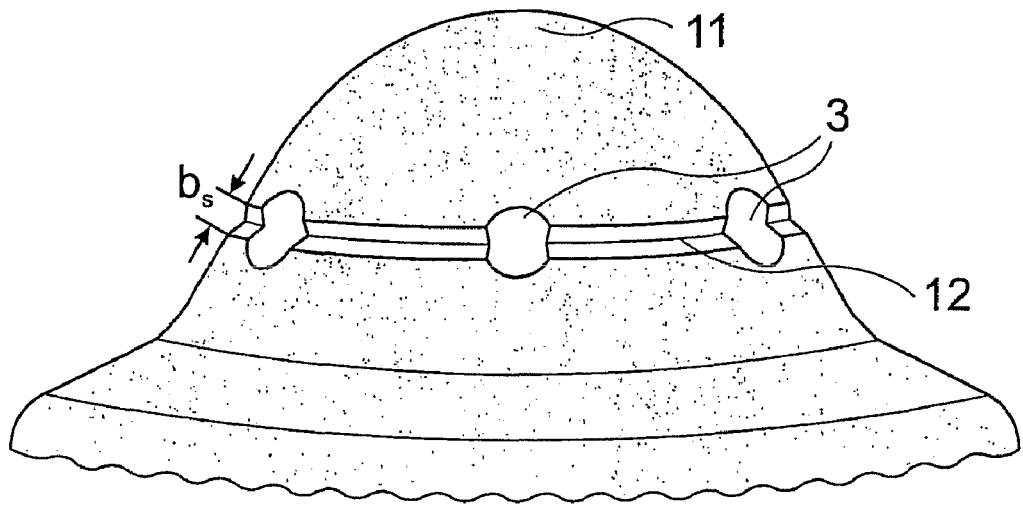
FIG. 4 is an elevational view of the head of an injection nozzle in accordance with the present invention and shows a continuous transverse slit on the hole circle at the fluid exit.

A specific embodiment of bore holes equipped with an auxiliary slit is illustrated in FIG. 4. If one assumes, for example, a nozzle having several injection holes whose fluid exits all lie on the same hole circle, the auxiliary slit may also be created as a continuous auxiliary slit 12 of breadth $b_S$ by means of a wide variety of methods, e.g. by means of a laser or through machining, prior to the actual boring process. The cross section of the continuous auxiliary slit 12 may in principle have any shape but should preferably have shapes such as a triangle, rectangle, semicircle or similar, located symmetrically to the hole circle.

Figures 5A, 5B, 5C:
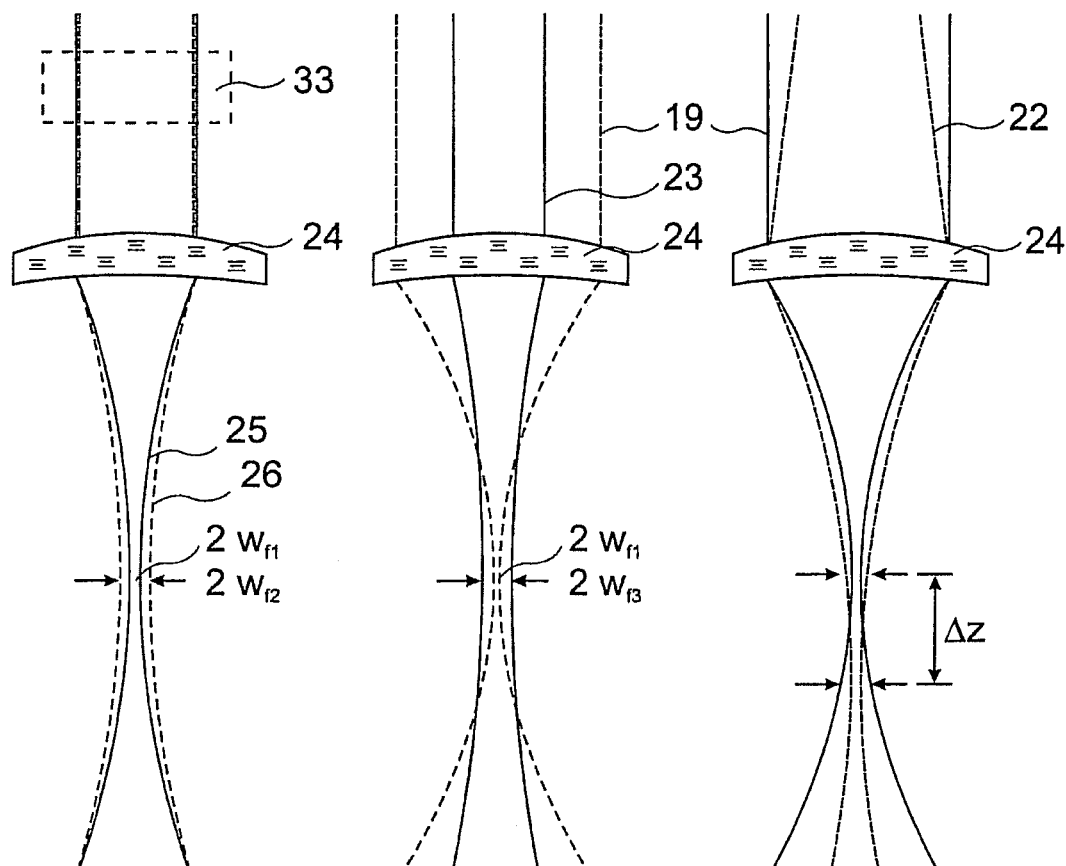
FIG. 5A is a diagram of a variant of the change of focus geometry during the boring process showing a variation of the K number of the laser radiation during the boring process.
FIG. 5B is a diagram of a variant of the change of focus geometry during the boring process showing a variation of the bundle diameter of the laser radiation at the location of the focusing element during the boring process
FIG. 5C is a diagram of a variant of the change of focus geometry during the boring process showing a variation of the bundle divergence of the laser beam at the location of the focusing element during the boring process

FIGS. 5A-C illustrate three variants of how the focus caustics can be changed during the boring process. The objective in this case is once again the realization of defined bore hole shapes.

FIG. 5A shows how the focus diameter $2w_{f1}$ of a first beam 25 with the beam quality number $K_1$ is enlarged to a focus diameter $2w_{f2}$ if the beam quality number $K_2$ of the modified beam 26 is smaller than $K_1$. In this context, the changing of the beam quality number may occur either internally, i.e. by intervention in the laser process itself, or externally, i.e. on the beam path from the laser to the work piece 33. The other beam parameters are presumed to be constant in this case.

FIG. 5B shows the influence of the change of the beam diameter on the focus lens 24 during the boring process on the respective focus diameter. While the original laser beam 19 with the larger diameter produces the sharp focus diameter $2w_{f1}$, an enlargement of the focus diameter $2w_{f3}$ will result from a reduction of the beam diameter on the lens (beam 23). Here, it can clearly be seen how much the entire shape of the focus caustics changes which creates the desired significant influence on the hole shape.

Finally, FIG. 5C shows the influence of a change of the divergence of the laser beam on the focus position during the boring process. The laser beam 22 with a divergence that was increased relative to the original beam 19 has a focus position that is displaced relative to the focus of the original beam by an amount Δz in the direction of the distance increase from the focus lens.

Figures 6A, 6B:
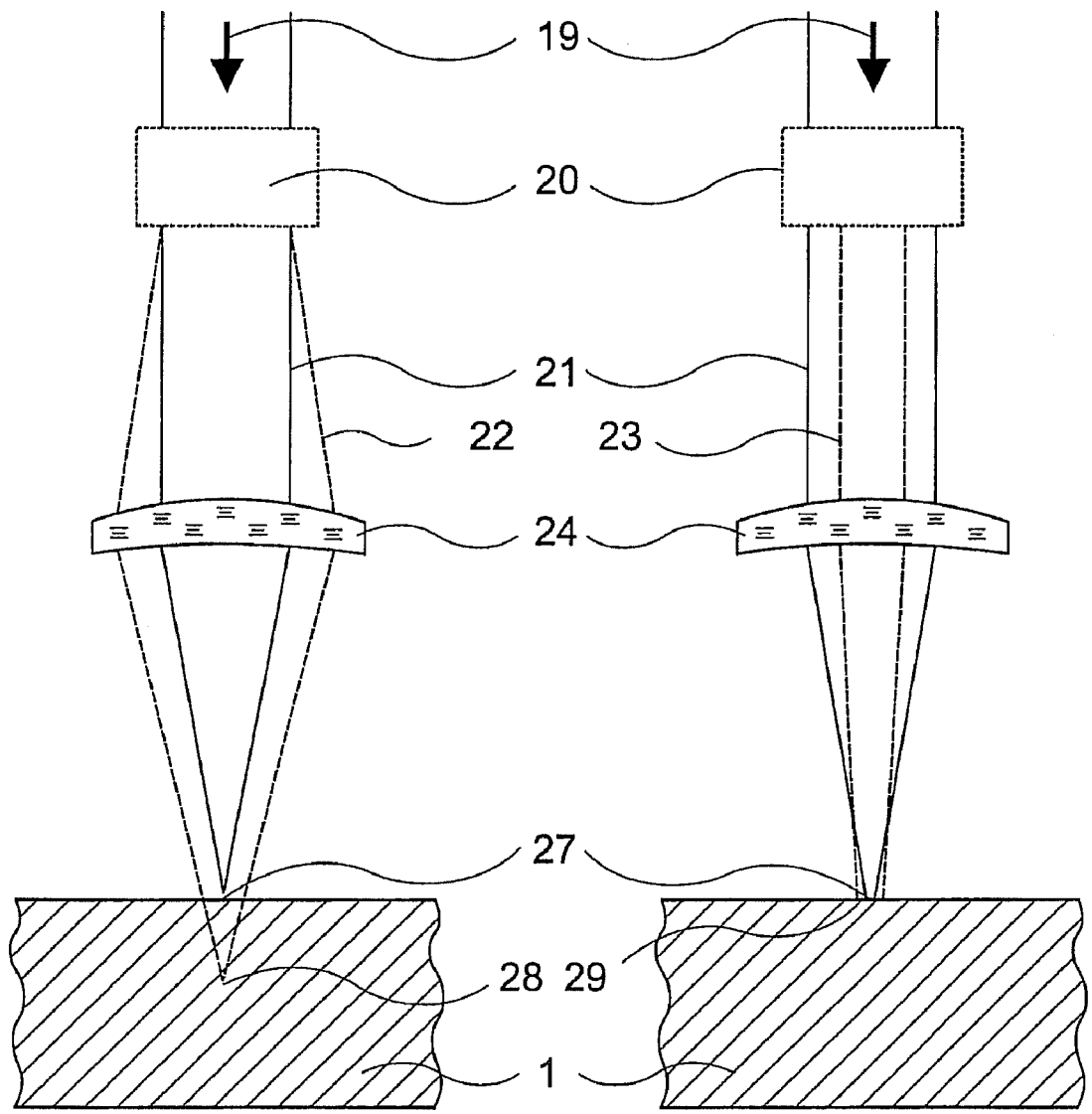
FIG. 6A is a diagram of the variation of divergence of the laser beam at the location of the focusing element by means of adaptive optics.
FIG. 6B is a diagram of the variation of diameter of the laser beam at the location of the focusing element by means of adaptive optics.

FIGS. 6A-B illustrate the two last-named variants of beam modification somewhat more in detail. In this case, it was assumed that the original beam 19 can be altered by means of adaptive optics 20 in such a way that a laser beam with altered divergence 22 (FIG. 6a) or a laser beam with altered diameter 23 (FIG. 6b) will result which in each case are focused by the focus lens 24 in the direction of the work piece 1. In case a), the focus position 27 of the unaffected beam 21 and the focus position 28 of the laser beam with altered divergence 22 are different, in case b), the laser beam with reduced diameter 23 has an enlarged diameter 29 as compared with the original focus.

Figure 7A:
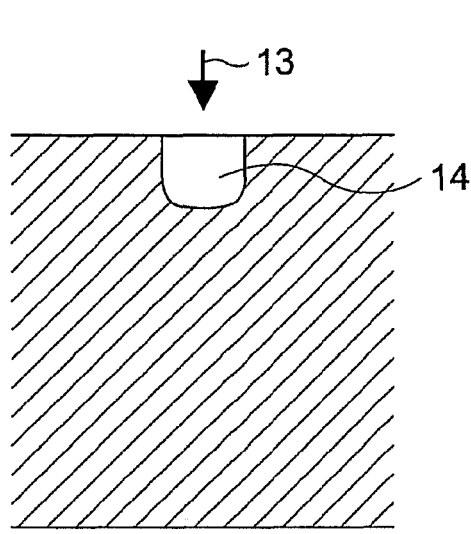
FIG. 7A is a diagram of the blind boring first stage of an injection hole in accordance with the present invention.
Figure 7B:
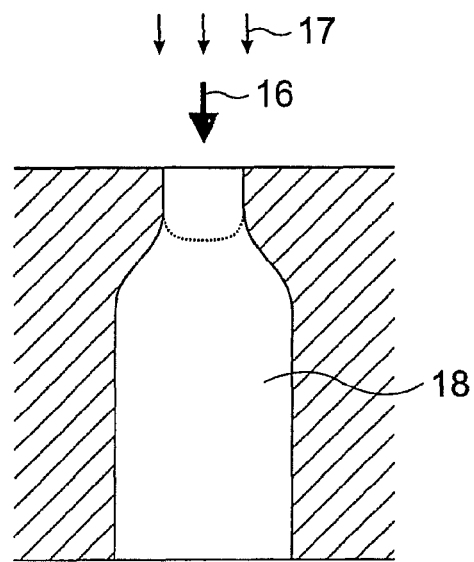
FIG. 7B is a diagram of the complete boring, showing a first and a second stage, of an injection hole in accordance with the present invention.

FIGS. 7A-B show the possibility of boring the desired holes by means of a two-step process in which the entire boring process is divided into a pre-boring segment and a shape-giving boring segment. FIG. 7a illustrates the pre-bored blind hole 14 created during the first process segment which is created, for example, by means of a laser of short-wave radiation or alternative methods such as machining, spark erosion or precision ultrasound machining. The expansion boring of the hole 18 to its final shape occurs, for example, by means of a long-wave radiation laser, in particular a $CO_2$ laser.

Figure 8A:
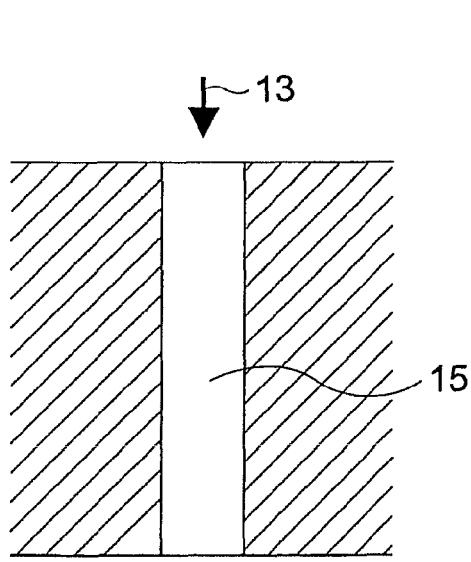
FIG. 8A is a diagram of the first stage of a two-stage boring of an injection hole in accordance with the invention, wherein the first stage is a perforation boring (pre-boring) with a small diameter.
Figure 8B:
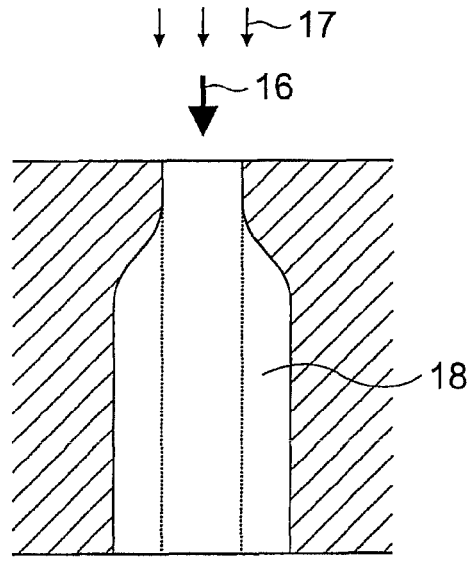
FIG. 8B is a diagram of a two-stage complete boring of an injection hole in accordance with the present invention.

The approach illustrated in FIGS. 8A-B is analogous. The only difference is that in the first process step a complete penetration boring 15 of the work piece occurs by means of one of the processed mentioned above which again is expanded to its final shape 18 in the second process step.

Figures 9A, 9B:
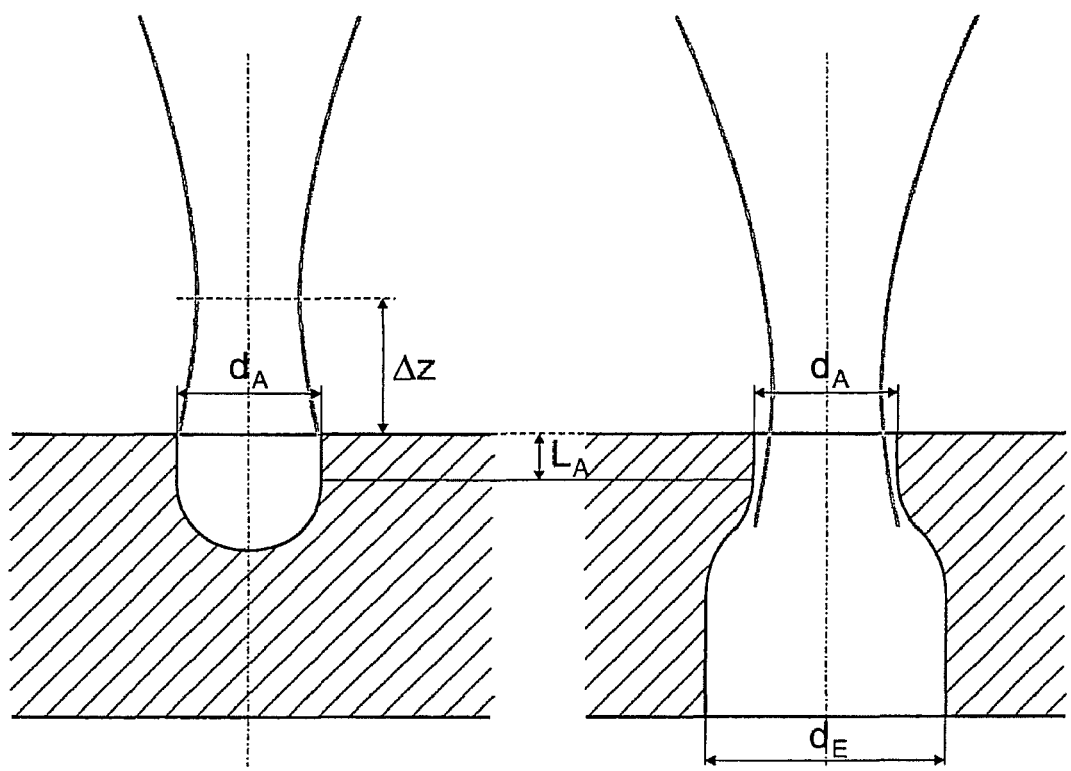
FIG. 9A is a diagram of the first stage of a two-stage boring of an injection hole in accordance with the present invention, wherein the first stage is a boring of the "bottle neck" with focus position above the surface of the work piece by amount $\Delta z$.
FIG. 9B is a diagram of the first and second stages of a complete boring, and wherein during second stage, the focus position is on the surface of the work piece.

FIGS. 9A-B illustrate an additional modification of the two-stage method. The main objective here is the optimal protection of the sharp upper edge of the boring created in the first boring phase with diameter $d_A$. As FIG. 9b shows, the focus waist was placed to this end over the surface of the work piece by a defined amount Δz. In the second process phase, one now exploits the fact that in this way, $d_A$ is a little larger than the diameter of the beam waist. If one now pushes the focus location downward by the amount Δz, that is on the surface of the work piece, the sharp upper edge of the hole is only hit by peripheral rays of the bundle that are so weak that no fusing will occur. At the same time, optimal preconditions are created for the expansion boring of the hole to the final shape with the fluid entry diameter $d_E$.

In the claims, means- or step-plus-function clauses are intended to cover the structures described or suggested herein as performing the recited function and not only structural equivalents but also equivalent structures. Thus, for example, although a nail, a screw, and a bolt may not be structural equivalents in that a nail relies on friction between a wooden part and a cylindrical surface, a screw's helical surface positively engages the wooden part, and a bolt's head and nut compress opposite sides of a wooden part, in the environment of fastening wooden parts, a nail, a screw, and a bolt may be readily understood by those skilled in the art as equivalent structures.

Having described at least one of the preferred embodiments of the present invention with reference to the accompanying drawings, it is to be understood that the invention is not limited to those precise embodiments, and that various changes, modifications, and adaptations may be effected therein by one skilled in the art without departing from the scope or spirit of the invention as defined in the appended claims.

The invention claimed is:

1. A method, for the drilling of holes in a workpiece within a diameter range of 20 μm to 500 μm by means of laser radiation, utilizing on the one hand, the beam quality of laser beam sources as well as, on the other hand, the polarization of said laser radiation, the parameters of the impulses of said laser used, and the type and the pressure of at least one process gas used, said method comprising the steps of:
(a) focusing said laser radiation, in particular the ratio of the beam diameter at the site of the focusing element and its focal distance which preferably lies between 1 and 6, and wherein said focusing is done in coordination with a beam quality number K and a wave length λ; and
(b) creating a bore hole with the length L whose shape is bottle-like and characterized by a smaller upper diameter $d_A$, an adjacent bottle neck with a length $L_A$ with a subsequent widening in a transition area to a diameter $d_E$, and the part that is cylindrical or slightly widening towards the lower end of said bore hole, a fluid entry opening, making up the main volume of said entire bore hole, with a ratio of the diameter of said fluid entry opening to the diameter of a fluid exit opening $d_E/d_A$ preferably lying in an interval of 1.3 to 2.0, a ratio of the length of said bore hole to the diameter of said fluid exit opening $L/d_A$ preferably being 2 to 20, and a ratio of the length of said bore hole to the length of said bottle neck $L/L_A$ lying within an interval of 3 to 10.

2. The method in accordance with claim 1, wherein:
said bore hole has the shape of an hourglass and a waist with diameter $d_T$ located at half the length of said bore hole, with said bore hole preferably widening symmetrically in the direction of said fluid entry opening and said fluid exit opening and the ratios between the diameter of said fluid entry opening to said bore hole waist $d_E/d_T$, as well as between the diameter of said fluid exit opening to the diameter of said bore hole waist $d_A/d_T$ preferably lying in the interval of 1.3 to 2.0.

3. The method in accordance with claim 1, wherein:
said bore hole has the shape of an hourglass and a waist with diameter $d_T$ is located in an upper half of said bore hole, with a ratio of the diameter of said fluid exit opening to the diameter of said bore hole waist $d_A/d_T$ preferably lying in the interval of 1.1 to 1.5 and the ratio of the diameter of said fluid entry opening to the diameter of said bore hole waist $d_E/d_T$ preferably lying in the interval of 1.3 to 2.0.

4. The method in accordance with claim 1, wherein:
said drilling process is divided into a first pre-drilling segment, and a second shaping segment.

5. The method in accordance with claim 1, wherein:
said drilling process is carried out with long-wave radiation with a wave length of 10 μm.

6. The method in accordance with claim 4, wherein:
said pre-drilling segment of the boring with the diameter $d_A$ including the bottle neck is created with a short-wave laser preferably having a wave length of 0.3 to 2 μm, and, in said shape-giving boring segment, the widened segments of the transition area and of said fluid entry area of said boring are created with a long-wave laser.

7. The method in accordance with claim 6, wherein:
said short wave laser has a wave length of 0.3 to 2 μm.

8. The method in accordance with claim 4, said method further comprising the steps of:
(a) pre-drilling the boring of the diameter $d_A$ including the bottle neck; and (b) creating said widened segments of said transition area and of said fluid entry area, in said shape-giving boring segment, by utilizing a long-wave radiation laser.

9. The method in accordance with claim 8, wherein: said pre-drilling segment of said boring is accomplished by selecting a step from a group of steps comprising:
(a) utilizing machining;
(b) utilizing spark erosion; and
(c) utilizing precision ultrasound machining.

10. The method in accordance with claim 1, said method further comprising the steps of:
(a) creating a complete perforation of said workpiece with the smallest free diameter; and
(b) widening said bore hole in said shape-giving boring segment by means of a long-wave radiation laser.

11. The method in accordance with claim 10, wherein: said creation of said complete perforation is accomplished by selecting a step from a group of steps comprising:
(a) utilizing a short-wave radiation laser;
(b) utilizing machining;
(c) utilizing spark erosion; and
(d) utilizing precision ultrasound machining.

12. The method in accordance with claim 4, wherein: said shape-giving segment, utilizes a short-wave radiation laser, preferably within the wave length range of 0.3 to 2 µm and wherein a small beam quality number K is used.

13. The method in accordance with claim 12, wherein K is <0.2.

14. The method in accordance with claim 12, wherein: said beam quality number of said laser beam is altered in the laser resonator.

15. The method in accordance with claim 12, wherein: said beam quality number of said laser beam is altered in the beam path from said laser to the focusing lens, through the selective installation of a diffractive optical element in said optical path.

16. The method in accordance with claim 1, said method further comprising the step of: expanding said rotation-symmetric bore hole proximate said fluid opening by utilizing a plurality of slits whose dimensions lie within the following intervals:
(a) slit width $b_s=(0.5-1)\times$diameter $d_A$ of the fluid exit opening;
(b) slit length $L_s=(1.5-3)\times$diameter $d_A$ of the fluid exit opening; and
(c) slit depth $t_s=(0.1-0.3)\times$length L of the boring.

17. The method in accordance with claim 16, wherein: said plurality of slits are created after the drilling of the rotation-symmetric part of said bore hole.

18. The method in accordance with claim 16, wherein: said plurality of slits are created by selecting a step from a group of steps comprising:
(a) utilizing a long-wave laser to create said plurality of slits;
(b) utilizing a short wave laser to create said plurality of slits;
(c) machining said plurality of slits;
(d) utilizing spark erosion to create said plurality of slits; and
(e) utilizing precision ultrasound machining to create said plurality of slits.

19. The method in accordance with claim 18, wherein: said long-wave laser is a $CO_2$ laser.

20. The method in accordance with claim 1, wherein: said bore holes are provided on a uniform hole circle and that a penetrating indentation of a width $b_s$ lying within the interval of $(0.5-1)\times$diameter of the fluid exit opening $d_A$ and a depth $t_s$ lying within the interval of $(0.5-2)\times$ diameter of said fluid exit opening $d_A$ is created prior to or after said drilling process by selection of a process selected from the group comprising:
(a) machining;
(b) spark erosion; and
(c) precision ultrasound machining,
with the cross section of said indentation preferably having shapes selected from the group comprising:
(d) triangular;
(e) rectangular; and
(f) semicircular
or the like, arranged symmetrically to said hole circle.

21. The method in accordance with claim 1, wherein: said method further comprises the step of varying, during said creation of said bore holes, the bundle diameter of the laser beam at the site of the focusing element.

22. The method in accordance with claim 21, wherein: the variation of the diameter or, respectively, of the divergence of the laser beam, occurs by means of adaptive optics.

23. The method in accordance with claim 1, wherein: said method further comprises the step of varying, during said creation of said bore holes, the bundle divergence of said laser beam at the site of said focusing element.

24. The method in accordance with claim 22, wherein: the variation of the divergence of the laser beam, occurs by means of adaptive optics.

25. The method in accordance with claim 1, wherein: said method further comprises the step of altering, during said creation of said bore holes, said beam quality number of said laser beam.

26. The method in accordance with claim 1, wherein: said laser drilling process is divided into a first segment and second segment, with the desired hole shape being created in said first segment, using a first working gas, that supports the formation of said hole shape and accelerates said drilling process, and the surface quality of the drilling walls being improved in said second segment by means of a second working gas.

27. The method of claim 26, wherein: said first working gas is oxygen.

28. The method of claim 26, wherein: said second working gas is argon.

29. A system, for the drilling of holes in a workpiece within a diameter range of 20 µm to 500 µm by means of laser radiation, utilizing on the one hand, the beam quality of laser beam sources as well as, on the other hand, the polarization of said laser radiation, the parameters of the impulses of said laser used, and the type and the pressure of the process gas used, said system comprising:
(a) laser radiation means for focusing said laser radiation, in particular the ratio of the beam diameter at the site of the focusing element and its focal distance which preferably lies between 1 and 6, and wherein said focusing is done in coordination with the beam quality number K and wave length λ; and
(b) a controller for controlling said laser radiation means so as to create a bore hole with the length L whose shape is bottle-like and characterized by a smaller upper diameter $d_A$, an adjacent bottle neck with a length $L_A$ with a subsequent widening in a transition area to a diameter $d_E$, and the part that is cylindrical or slightly widening towards the lower end of the bore hole, the fluid entry opening, making up the main volume of the entire bore hole, with the ratio of the diameter of the fluid entry opening to the diameter of the fluid exit opening $d_E/d_A$ preferably lying in an interval of 1.3 to 2.0, the ratio of the length of the bore hole to the diameter of the fluid exit opening $L/d_A$ preferably being 2 to 20, and the ratio of the length of the bore hole to the length of the bottle neck $L/L_A$ lying within an interval of 3 to 10;

(c) a first working gas that supports the formation of said hole shape and accelerates said drilling process; and (d) a second working gas for improving the surface quality of the drilling walls being improved in the second segment.

30. A method, for the drilling of holes in a workpiece within a diameter range of 20 µm to 500 µm by means of laser radiation, utilizing on the one hand, the beam quality of laser beam sources as well as, on the other hand, the polarization of said laser radiation, the parameters of the impulses of said laser used, and the type and the pressure of the process gas used, said method comprising the steps of:

(a) focusing said laser radiation, in particular the ratio of the beam diameter at the site of the focusing element and its focal distance which preferably lies between 1 and 6, and wherein said focusing is done in coordination with the beam quality number K and wave length λ;

(b) creating a bore hole with the length L whose shape is bottle-like and characterized by a smaller upper diameter $d_A$, an adjacent bottle neck with a length $L_A$ with a subsequent widening in a transition area to a diameter $d_E$, and the part that is cylindrical or slightly widening towards the lower end of the bore hole, the fluid entry opening, making up the main volume of the entire bore hole, with the ratio of the diameter of the fluid entry opening to the diameter of the fluid exit opening $d_E/d_A$ preferably lying in an interval of 1.3 to 2.0, the ratio of the length of the bore hole to the diameter of the fluid exit opening $L/d_A$ preferably being 2 to 20, and the ratio of the length of the bore hole to the length of the bottle neck $L/L_A$ lying within an interval of 3 to 10;

(c) dividing said drilling process process into a first pre-drilling segment, and a second shaping segment;

(d) creating a complete perforation of said workpiece with the smallest free diameter; and (e) widening said bore hole in said shape-giving boring segment by means of a long-wave radiation laser.

* * * * *